3,408,292
WATER FILTRATION PROCESS

Mahmoud T. Dajani, Park Forest, and Thomas G. Cocks, La Grange Park, Ill., assignors to Nalco Chemical Company, Chicago, Ill., a corporation of Delaware
No Drawing. Filed Mar. 24, 1966, Ser. No. 536,976
4 Claims. (Cl. 210—52)

This invention relates to an inmprovement in a process for removing finely-divided suspended solids from aqueous liquids using the principles of filtration. Specifically, the invention relates to an improvement in the method of filtering turbid waters according to the process described in U.S. Patent 3,131,144. In a preferred embodiment, the invention provides a method for improving the performance of turbid water filtration in which the water contains an appreciable amount of chlorine.

The process set forth in U.S. Patent 3,131,144, the disclosure of which is incorporated herein by reference, has been found to be highly successful in removing suspended solids and especially suspended organic coloring matter from the class of waters known as low turbidity waters. Briefly, the process comprises adding a cationic polymer selected from among polyethyleneimines, polymers resulting from condensation polymerization of an alkylene polyamine and a halohydrin, and polymers of polyfunctional halohydrins and ammonia to a quantity of a turbid water in an amount sufficient to increase filtration but not sufficient to form a visible floc. Thereafter, the treated water is filtered prior to formation of any visible floc, by pasing the treated water through a natural filter medium of either sand or anthracite coal. This process has achieved significant successes in the art, and has been adapted to treat a multitude of turbid waters.

While the process described above has been found to be highly successful, one limitation of this process has been discovered which significantly decreases its overall efficiency and commercial acceptance. Briefly stated, the problem which materially effects the efficiency of the filtration of turbid waters is the adverse effect of residual chlorine on chemicals used in that process.

Municipal and industrial filtration plants process large volumes of water each day. Due to the interest in pollution control, a number of procedures have been instituted to assure that the treated water is sufficiently pure to avoid contaminating rivers, streams and other bodies of water. One particular process which has been adopted is prechlorination whereby the water is first chlorinated to destroy harmful bacteria and other unwanted contaminants. Usually, in such processes, the amount of chlorine added exceeds the demand by the contaminants, resulting in a residual chlorine content up to about 1.0 p.p.m. or higher. Oftentimes, the method of feeding chlorine to the water is not continuous. Intermittent slug feeding of chlorine results in waters which contain a high amount of chlorine, such as, for example, 6 to 7 p.p.m. or higher. The presence of chlorine in waters which are normally processed by in-line filtration in conjunction with filtration aid chemicals has been found deleterious, especially when the chemicals are polyamines of one type or another. It has been discovered that these polyamines are unsatisfactory, and in some cases, completely ineffective in processes wherein water is filtered if that water contains any significant amount of residual chlorine.

Accordingly, it is an object of this invention to provide a process for filtering water which contains suspended solids and at least 0.1 p.p.m. of chlorine dissolved therein.

Another object of this invention is to provide a class of chemicals which may be used to effect filtration of water which contains at least 0.1 p.p.m. of chlorine.

A specific object of this invention is to modify polyamines so as to improve filtration methods, whereby waters which contain residual chlorine in any substantial amount may be treated by the use of such modified polyamines.

In accordance with the invention, a method for filtering aqueous liquids containing finely-divided suspended solids and at least 0.1 p.p.m. of residual chlorine has now been discovered. Briefly, the process comprises adding to the turbid water an amount of a polyquaternary compound sufficient to increase the rate of filtration but insufficient to form a visible floc, and thereafter passing said liquid which has been treated through a filtering medium of sand, anthracite coal or mixtures thereof.

As previously indicated, the invention is particularly useful in treating low turbidity waters. For the purpose of this invention, these low turbidity waters may be considered as containing turbidities of not more than 1000 p.p.m. Hellige expressed as $SiO_2$. Most waters which are considered as being low turbidity waters contain as little as 5 p.p.m. of suspended solids and may contain as much as several hundred p.p.m. Typical low turbidity waters upon which this invention has shown optimum effectiveness, quite frequently contain from 10 to 100 p.p.m. of suspended solids. When used in accordance with the procedures of this invention, the polyquaternary compounds described below will give effective results when used to treat low turbidity waters, at dosages ranging from as little as ½ p.p.m. to as much as 50 p.p.m. As a general rule, most waters are susceptible to treatment at dosages ranging between 2 and 10 p.p.m.

When the invention is used to treat low turbidity waters containing organic coloring material, it is desirable to employ with the polyquaternary compound alum which materially aids in color removal by the filter. Thus, when the two reagents are conjointly employed, the weight ratio of polyquaternary compound to alum will usually be within the range of 1:3 to 1:10 with the preferred ratio being at about 1:3 to 1:5.

Since water supplies vary considerably, it is contemplated that experimentation will be required to most effectively utilize the invention. For instances, it may be necessary to try several different dosages of the polymer to determine optimum filtration results. Similarly, experimentation may be necessary to determine the proper polyquaternary compound-alum ratio. An important variable which must be determined is the amount of mixing and agitation imparted to the treated water to assure adequate mixing and yet to prevent floc formation.

The compounds of this invention have been defined as polyquaternary compounds. These compounds are polymers which contain a plurality of basic nitrogen sites in form of quaternary groups. These materials may be prepared by polymerizing a quaternary amomnium monomer, such as, for example, dimethyl diallyl ammonium chloride, or by alkylation of already formed polyamine compounds. Examples of typical polyamines which may be converted to polyquaternary compounds are: polyethyleneimine, polyethyleneamine, condensation polymers of ammonia or alkylene polyamines and poly halides such as ethylene dichloride, and addition polymers derived from monomers containing basic nitrogen groups such as dimethylaminoethyl methacrylate, 2-vinyl pyridine, N-vinyl pyridine or substituted allyl amines. Alkylation of these polyamines to form polyquaternary compounds may be accomplished by use of a wide variety of compounds. Examples of these alkylation agents are dimethyl sulfate, methyl chloride, $C_2$–$C_{22}$ alkyl halides, such as ethyl chloride, propyl chloride, etc., alkaryl halides such as benzyl chloride, substituted benzyl chlorides, epihalohydrins such as epichlorohydrin, sulfones, oxirianes, lactones, such as beta-propiolactane, polyoxyalkylene halides and the like. Preparation of these polyquaternaries is conventional, and the choice of the particular polyamines and alkylating agents is left to the discretion of the operator. A wide variety of these materials are available commercially. It is preferred, for the purposes of this invention, to alkylate at least 50% and more preferably 75% or more of the available nitrogen sites.

One requirement is that the polyquaternary compound be water-soluble at the dosage level which is employed in the process of this invention. Usually this only requires solubility in the order of about 10 p.p.m., but the more water-soluble materials are obviously preferred. Especially suitable for the purposes of this invention are those polyquaternary compounds which contain 2–3 lower alkyl groups of from 1 to 5 carbon atoms attached to the quaternary nitrogen atom. When the nitrogen atoms form part of the polymer backbone as in most condensation polymers it is preferred that remaining valences be satisfied by two lower alkyl groups. On the other hand, when the quaternary group is a side-chain off the polymer backbone as, for example, in addition polymers, it is preferred that three nitrogen valences be satisfied by lower alkyl groups.

Presented below in Table I are a number of polyamines and corresponding polyquaternary compounds. It has been determined that in each case the polyquaternary compound was substantially superior when used in a filtering process of the invention when compared with the parent polyamine. Improvements in efficiency in the order of 25 to 100% are obtainable according to the process of this invention. The polyquaternary compounds in Table I were seen to substantially increase the filtration rate in every case, even though the parent polyamines did not demonstrate nearly as much effectiveness in the presence of appreciable amounts of chlorine. Use of these same materials in a system which contains no residual chlorine shows relatively little distinction between polyamine and its corresponding quaternary compound.

TABLE I

| Polyamine | Polyquaternary Compound |
| --- | --- |
| 1. Polyethyleneimine | Methyl chloride quaternary of No. 1. |
| 2. Ammonia-ethylene dichloride condensation polymer. | Methyl quaternary compound of No. 2. |
| 3. Polydimethylaminoethyl methacrylate. | N-butyl chloride quaternary of No. 3. |
| 4. Copolymer of acrylamide and dimethylamino methacrylate. | Allyl chloride quaternary of No. 4. |
| 5. Tetraethylenepentamine-epichlorohydrin condensation polymer. | Methyl chloride quaternary of No. 5. |
| 6. Ammonia-epichlorohydrin condensation polymer. | Benzyl chloride quaternary of No. 6. |

When the above polyamines were used in the process of this invention, wherein turbid waters having residual chlorine contents above 0.1 p.p.m. were filtered after the addition of such a polyamine, substantial difficulty was seen in increasing the filtration rate. What is believed to happen is that the presence of residual chlorine retards the activity of the polyamine. Consequently, additional amounts of the polyamine must be added to overcome this detrimental effect from the residual chlorine. However, when the amount of polyamine is increased sufficiently to overcome the residual chlorine, floc formation takes place almost immediately, thereby plugging the bed and adversely affecting the filtration rate. On the other hand, the polyquaternary compounds, in being resistant to residual chlorine effects, may be employed effectively at dosages which are low enough so that no floc formation occurs, and are still capable of increasing filtration rates substantially.

Having thus described the invention, what is claimed is:

1. A method for filtering aqueous liquids containing finely-divided suspended solids and at least 0.1 p.p.m. of residual chlorine which comprises: adding to said liquid an amount of a polymer which contains a plurality of basic nitrogen sites in form of quaternary groups sufficient to increase the rate of filtration but insufficient to form a visible floc, and thereafter passing said liquid through a filtering medium selected from the group consisting of sand, anthracite coal and mixtures thereof.

2. The method of claim 1 where the polymer contains a plurality of nitrogen atoms having attached thereto 2–3 alkyl groups having from 1 to 5 carbon atoms.

3. The method of claim 2 where the alkyl group is methyl.

4. The method of claim 2 where alum is additionally added to said liquid prior to filtration, the alum being added in an amount sufficient to provide a weight ratio of polymer to alum ranging from 1:3 to 1:10.

References Cited
UNITED STATES PATENTS

| | | | |
| --- | --- | --- | --- |
| 2,688,583 | 9/1954 | Darragh et al. | 210—50 X |
| 3,055,827 | 9/1962 | Wiley | 210—54 X |
| 3,131,144 | 4/1964 | Nagan | 210—54 |

MICHAEL E. ROGERS, *Primary Examiner.*